United States Patent

Schwab

[15] 3,650,153
[45] Mar. 21, 1972

[54] APPARATUS AND METHOD FOR APPLYING STERILE COVER TO TEMPERATURE SENSITIVE PROBE

[72] Inventor: Ardath M. Schwab, 606 Camino Cerrado, South Pasadena, Calif. 91030

[22] Filed: Oct. 7, 1969

[21] Appl. No.: 864,385

[52] U.S. Cl. ..................73/343 R, 73/362 AR, 206/16.5
[51] Int. Cl. ......................B65d 85/20, G01k 1/08
[58] Field of Search............73/362 AR, 343; 206/16.6, 16.5

[56] References Cited

UNITED STATES PATENTS

| | | | |
|---|---|---|---|
| 3,254,533 | 6/1966 | Tongret | 73/362 |
| 3,377,862 | 4/1968 | Gheorghiu | 73/362 |
| 3,500,280 | 3/1970 | Ensign | 73/362 |
| 3,550,448 | 12/1970 | Ensign | 73/362 X |

FOREIGN PATENTS OR APPLICATIONS

| | | | |
|---|---|---|---|
| 134,587 | 11/1919 | Great Britain | 206/16 |

Primary Examiner—Louis R. Prince
Assistant Examiner—Denis E. Corr
Attorney—Miketta, Glenny, Poms and Smith

[57] ABSTRACT

A sleeve is slidably mounted between stop means and in a slight friction fit upon a cylindrical temperature sensitive probe and has a radially outwardly extending rim about an end thereof which is movable beyond the probe end to be inserted into a sterile flexible package. An elastic ring on the end of a latex probe cover fits over said sleeve rim while said sleeve is inserted into the package whereupon sliding movement of the sleeve down the probe places the sterile cover over the probe without manual contamination of the exterior of the cover.

3 Claims, 5 Drawing Figures

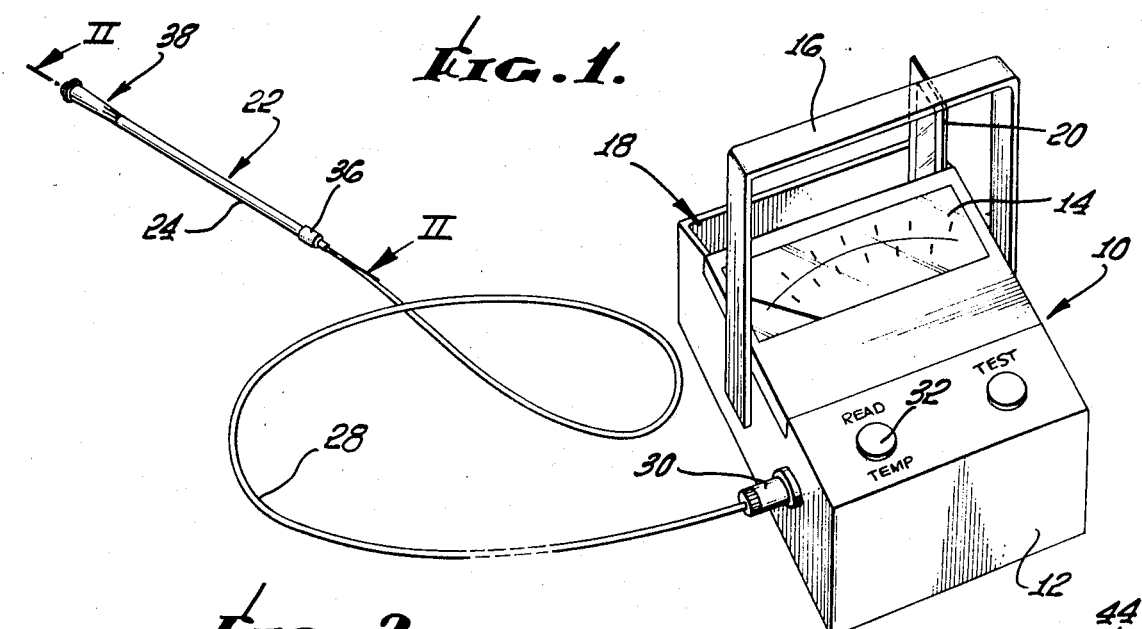
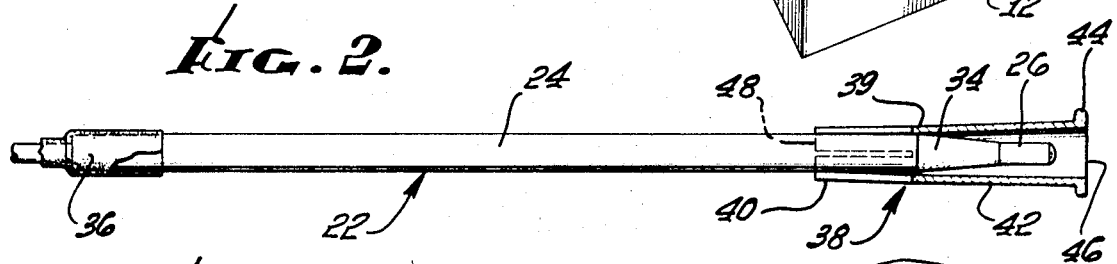
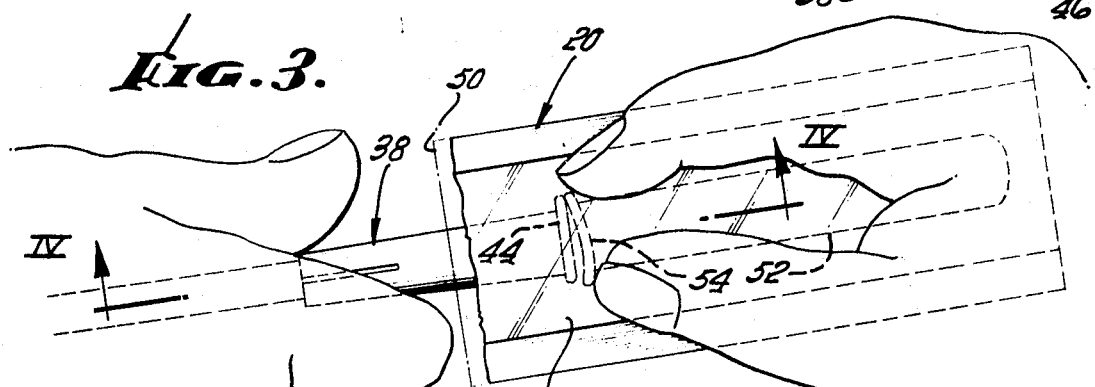
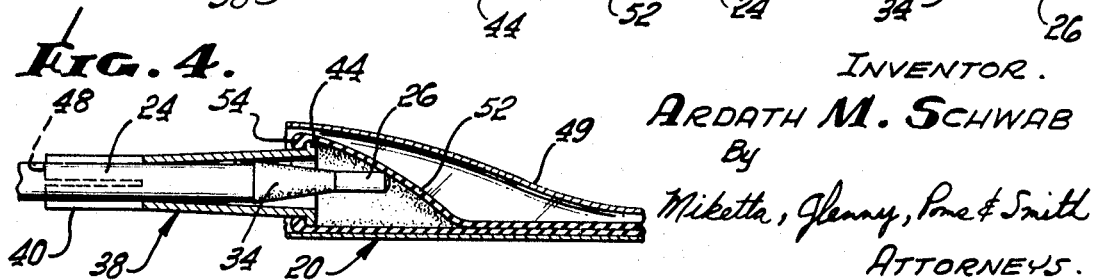
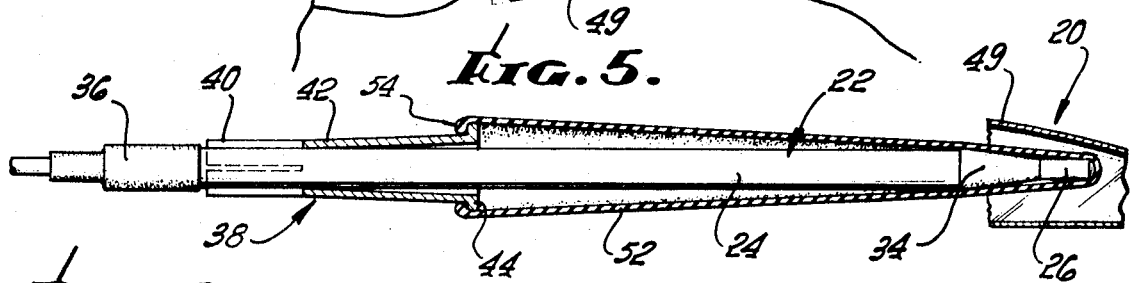
INVENTOR.
ARDATH M. SCHWAB
By
Miketta, Glenny, Poms & Smith
ATTORNEYS.

3,650,153

APPARATUS AND METHOD FOR APPLYING STERILE COVER TO TEMPERATURE SENSITIVE PROBE

RELATED APPLICATION

The apparatus and method for applying a sterile cover to a temperature sensitive probe, of the present application, is intended primarily for use with the apparatus for measuring body conditions disclosed in my copending application Ser. No. 689,718 filed Dec. 11, 1967.

BACKGROUND OF THE INVENTION

1. Field of the Invention

This invention relates in general to apparatus used for measuring body conditions, such as body temperature, including thermo-responsive probes and more particular to an improvement in apparatus and methods for applying a sterilized elastic cover, from within a sterile package, onto a temperature sensitive probe utilized with the aforesaid type of measuring apparatus without a manual contacting or handling of the exterior of the cover after it is removed from the sterile package and preparatory to its use in measuring body temperatures.

2. State of the Prior Art

The most common manner of taking temperatures of persons who are patients in hospitals, or at home, currently involves the use of a glass thermometer or the like. Electrical instruments have also been devised which indicate a temperature reading on an electrically actuated meter which is connected to a heat-sensitive element embedded in the end of a probe. Such a device is disclosed in my copending application Ser. No. 689,718 filed Dec. 11, 1967. Such temperature sensitive probes, as in the case of glass thermometers, must be sterilized before each use in taking the temperature of a patient in a hospital or in like situations where the probe or thermometer might be used with different patients. In my aforesaid copending application, the exemplary temperature sensitive probe is provided with a sterilized latex cover. However, I have found that it is extremely difficult to remove a latex or rubberlike cover from a sterile package and place it over the free end of the probe without some handling or manipulation of the cover causing the likelihood of contamination thereof. Further, it is difficult and time consuming to attempt to insert the probe into the elastic pliant cover material while it is still within its sterilized package since it tends to slip around therein and resists being pulled over the end of the probe.

It is therefore the primary object of the present invention to disclose and provide an apparatus and method for applying a sterile latex plastic material or rubberlike cover from within a sterilized package onto the free end of a temperature sensitive probe usable with electrical apparatus for measuring body temperatures which will allow for an easy, quick application of the cover onto the probe with a minimum of handling of the cover, and particularly, without manual contacting or touching of the cover outside of its sterilized package which might cause contamination thereof.

It is another object of the present invention to disclose and provide an apparatus and method as in the foregoing object wherein means are provided on the probe which can be inserted into the sterilized package and placed in contact with the cover and which causes an automatic drawing of the cover over the probe upon manipulation of such means along the probe body.

SUMMARY OF THE INVENTION

Generally stated, the apparatus and method for applying a latex plastic material or elastic probe cover onto a temperature sensitive probe, according to the present invention, includes the provision of a sleeve slidably mounted on the probe body for movement toward and away from a free end thereof. Stop means are provided on the probe body to limit movement of the sleeve between a retracted and protracted position, the sleeve free end extending beyond the free end of the probe in the aforesaid protracted position. The free end of the sleeve is provided with a radially outwardly extending rim which, when the sleeve is in the protracted position, can be inserted into a sterilized package containing a latex plastic or rubberlike elastic probe cover made in accordance with the present invention.

The probe cover contemplated within the present invention includes an elastic ring around the open end of the cylindrical or closed end tubular cover body which is adapted to resiliently snap over the aforesaid rim on the sleeve. In accordance with the present method, the sleeve is placed in a protracted position relative to the probe and inserted into an open end of a sterilized package containing a sterile probe cover. The cover ring is then manipulated from outside the package about the sleeve rim and thereafter, the withdrawal of the sleeve to its retracted position automatically pulls the probe cover over the free end of the probe.

In accordance with the apparatus and method of the present invention, the probe cover is thus placed upon the probe without any manual contacting or touching of the probe cover itself when it is outside of its sterilized container or package. Such package may be made of a transparent paper or other suitable transparent wrap so that the cover ring may be visually observed during the step of snapping the ring over the sleeve rim.

A more complete understanding of the apparatus and method for applying a probe cover to a temperature sensitive probe in accordance with the present invention, as well as additional objects and advantages thereof, will be obtained by those skilled in the art from a consideration of the following detailed explanation of an exemplary embodiment thereof. Reference will be made to the appended sheet of drawings in which:

DESCRIPTION OF THE DRAWINGS

FIG. 1 is a perspective view of an exemplary apparatus for measuring body temperature which includes a temperature sensitive probe provided with a preferred exemplary embodiment of the apparatus for applying an elastic probe cover to a temperature sensitive probe in accordance with the present invention;

FIG. 2 is a side view, partially in section, of the temperature sensitive probe and associated apparatus of FIG. 1 taken therein along the plane II—II;

FIG. 3 is a somewhat schematic representation of the method of manipulating a probe cover made in accordance with the present invention within its sterilized package onto the apparatus of the present invention provided on a temperature sensitive probe preparatory to drawing the cover over the probe;

FIG. 4 is a detailed section view of the probe and apparatus of FIG. 2 taken therein along the plane IV—IV, after the probe cover ring has been resiliently snapped over the sleeve rim with the rim and cover still within the sterilized package but with the initial movement of the sleeve down the probe having occurred to place the free end of the temperature sensitive probe within the cover prior to full retraction of the sleeve; and FIG. 5 is a side view of the probe and apparatus of FIG. 2, partially in section, showing the sleeve in full retracted position and the associated probe cover stretched over the free end of the probe preparatory to taking a patient's temperature without any manual contacting or touching of the cover outside of the associated sterilized package in accordance with the method of the present invention.

DESCRIPTION OF THE PREFERRED EMBODIMENT

An exemplary apparatus for measuring body conditions is shown in FIG. 1 generally at 10. Such apparatus may include a housing 12 provided with an electric or voltage meter 14 and handle 16. A pocket or a storage bin 18 is provided in the exemplary apparatus for measuring body conditions in which a plurality of disposable probe covers may be stored. It is contemplated that such protective probe covers will be packaged and stored in individual envelopes or internally sterilized packets 20. The preferred exemplary embodiment of probe and associated apparatus for applying a probe cover thereto are indicated generally at 22 in FIG. 1. The probe body 24 is preferably of uniform, smooth, cylindrical configuration and is made of a non-corroding material, such as stainless steel. A thermistor or thermo-resistor with a high negative temperature coefficient of resistance is provided in known manner within a molded plastic, such as styrene, head or free end 26 of the probe, as best seen in FIG. 2. Electrically conductive wires, not shown, are connected to such thermistor in the probe head 26 and run via line 28 to the connector 30 for attachment to the associated electric meter and housing in the apparatus indicated generally at 10. The temperatures sensed by the probe end 26 can be read off of the temperature graduated dial of the electric meter 14 upon completion of an electrical circuit via the "read" button 32 appropriately provided in the electrical circuitry. A more complete explanation of the apparatus for sensing body temperatures, the nature of the thermistor and the associated electrical circuitry can be obtained through a review of my copending application Ser. No. 689,718.

As particularly contemplated within the present invention, apparatus is provided in association with the temperature sensitive probe for facilitating the application of latex plastic or rubberlike probe covers onto the probe without contamination thereof through excessive handling. In accordance with the present invention, the probe body 24, as best seen in FIG. 2, is provided with a uniform diameter cylindrical configuration with a free end stop means 34 and a line connected end stop means 36. The stop means are suitably shaped to have a width greater than the uniform diameter of the probe body to provide a shoulder adjacent either end thereof. Such stop means may comprise rubber or plastic covers provided over the stainless steel or plastic probe body portions. As particularly contemplated within the present invention, sleeve means are provided on the probe body 24 for engaging the open free end of a probe cover and for drawing such cover over the probe means upon sliding movement of such means down the probe body. In the preferred exemplary embodiment, such sleeve means are indicated generally at 38.

Sleeve means in the preferred exemplary embodiment comprise a tubular member 39 having a rear slotted cylindrical portion 40, a tubular outwardly flairing or bell-like body portion 42 and a radially outwardly extending end rim 44 about the free end 46 thereof. The rim 44 functions as a means on the sleeve for removably retaining or engaging the open end of a probe cover to be placed upon the probe as hereinafter more fully described. The outward flairing of body 42 from the rearward to forward portions allows rim 44 to be of a substantially larger diameter than that of the probe body 24 to facilitate drawing of the probe cover over the probe. The slotted rear portion 40 provides a plurality of finger portions or members 48 which are initially biased radially inwardly of the sleeve prior to its assembly on probe body 24 to provide a slight friction fit between the sleeve means and probe body. The sleeve means 38 is thus manually slidable along the probe body 24, between the shoulders of the stop means 34 and 36 but tends to retain its position therealong due to the slight friction fit between the rear portion 40 of the sleeve means and body 24 as aforedescribed.

Sleeve means 38 are mounted upon the probe body 24 as aforedescribed, but also in order to be moved, in accordance with the present invention, from a retracted position adjacent the line end of the probe body 24 adjacent stop 36 and a protracted position, as seen in FIG. 2, wherein the free end 46 and rim 44 of the sleeve means protract, project or overhang the free end 26 of the probe. As best seen in FIG. 2, stop means 34 is positioned on the forward end of the probe body 24 and the outward flairing configuration and length of sleeve body 42 are chosen such that when the cylindrical rear end portion 40, or the adjacent portion of body 42, contact stop 34, the rim 44 and free end 46 overhang the free end 26 of probe body 24. The inner surface of sleeve means 38 and stop means 34 on the probe thus cooperate one with the other in order to allow a halting of forward movement of the aforedescribed sleeve means when it is placed in its protracted position of FIG. 2 ready for the next step in the method of applying a probe cover to a temperature sensitive probe in accordance with the present invention.

Referring now to FIG. 3, the apparatus of FIG. 2 is shown being inserted into the torn or peeled open end of a sterile cover packet for mounting or engaging the open end of a probe cover over the sleeve means rim 44. As contemplated within the present invention, a package 20 may be provided with a paper backing and a transparent cover 49. The package should be easily torn, as indicated at 50 to open one end thereof to allow insertion of the sleeve means, indicated generally at 38, into the package when such sleeve means is in its protracted position of FIG. 2. The probe covers in use are generally constructed of a thin, highly elastic material having a high tear strength to facilitate their assembly on and off of the probe. Latex material is generally used therefor. However, these probe covers are in practice very difficult to assemble to the probe and are easily contaminated through over handling thereof during assembly to the probe. In accordance with the present invention, and as seen in FIGS. 3 through 5, such probe covers 52 are provided with an integral elastic end ring 54 adapted to stretch over and snap behind the sleeve end rim 44.

In accordance with the method of the present invention, and again referring to FIG. 3, the internally sterilized package 20 is peeled or ripped open to allow insertion of the protracted sleeve means 38, such sleeve means being held in one hand by the operator, while the ring 54 of the probe cover is manually grasped from exteriorly of the package 20 by the operator's other hand. By appropriate manipulation, ring 54 is easily rolled or snapped over rim 44 into the position shown in FIG. 4 with the cover 52 still well within the internally sterilized package 20. Upon relative movement of sleeve means 38 and probe body 24, end 26 begins to project into the probe cover 52 as seen in FIG. 4 even while the cover is still within the sterilized package.

After elastic ring 54 has been placed over sleeve means end ring 44, as seen in FIG. 4 and as accomplished through the manipulation generally illustrated in FIG. 3, the sleeve means is manually slid from its protracted position of FIG. 2 down the probe body 24 to the retracted or withdrawn position of FIG. 5. In the position of FIG. 5, the sleeve may or may not have been brought into actual contact with the stop means 36 which serves to prevent inadvertent withdrawal of the sleeve off of the probe body. Stop means 36 also prevents an overstretching of the probe cover 52 over the probe which might cause it to tear or otherwise be ruptured.

It can be seen from the foregoing that through use of the apparatus of the preferred exemplary embodiment, and the manipulation thereof in accordance with the method of the present invention as hereinbefore described, a sterile probe cover of elastic material may be applied to a temperature sensitive probe from within its internally sterilized package without any actual touching or contacting of the cover exterior by a foreign object. Cover 52 can thus be placed upon the probe body 24 and head 26, as seen in FIG. 5, in completely sterilized condition ready for use in measuring a person's body temperature. Upon the completion of the taking of such body temperature, the probe cover 24 may be easily disposed of by reversing the above procedure, to place it back in a package ready for disposal, or can be merely removed off of the sleeve and probe prior or after to movement of the sleeve to its protracted position. The within apparatus and method achieve the objects aforestated in allowing an easy, quick and reliable application of a sterile cover onto a temperature sensitive probe. It should be understood by those skilled in the art that the aforedescribed preferred exemplary embodiment is exemplary only and that other embodiments, modifications and adaptations thereof can be made within the scope of the present invention which is defined and limited only by the following claims.

I claim:

1. In an apparatus for measuring body temperature of the type employing a temperature sensitive probe, the improvement comprising the provision of:

a sleeve slidably mounted on said probe for movement toward and away from a free end thereof;

means on said sleeve for removably retaining an open end of a tubular resilient probe cover on said sleeve when said sleeve is adjacent said probe free end whereby movement of said sleeve away from said probe free end draws said probe cover over said probe; and cooperating stop means on each of said probe and said sleeve for halting sliding movement of said sleeve toward said probe free end when a portion of said sleeve overhangs said probe free end.

2. In an apparatus for measuring body temperature of the type employing a temperature sensitive probe the improvement comprising the provision of:

a sleeve slidably mounted on said probe for movement toward and away from a free end thereof;

means on said sleeve for removably retaining an open end of a tubular resilient probe cover on said sleeve when said sleeve is adjacent said probe free end whereby movement of said sleeve away from said probe free end draws said probe cover over said probe, said means on said sleeve including an outwardly projecting rim about a free end of said sleeve; and stop means on said probe generally adjacent said free end for halting sliding movement of said sleeve when said sleeve is in a protracted position relative to said probe.

3. A method of applying a resilient, tubular, elastic cover onto a temperature sensitive probe of the type used for measuring body temperature comprising the steps of:

providing a sterile probe cover with an elastic ring about its free end within an internally sterile package;

moving a sleeve on a temperature sensitive probe to the free end thereof and inserting a free end of said sleeve into said ring through an opened end of said package, said step of moving said sleeve on said probe to said free end thereof includes movement of said sleeve free end to a protracted portion overhanging said probe free end to facilitate said inserting said sleeve free end into said cover ring; and drawing said sleeve over said probe to remove said cover from said package and place it over said probe without manually touching said cover.

* * * * *